United States Patent
DeCusatis et al.

(10) Patent No.: US 7,826,745 B2
(45) Date of Patent: Nov. 2, 2010

(54) OPEN FIBER CONTROL AND LOSS OF LIGHT PROPAGATION IN TIME DIVISION MULTIPLEXED INTER-SYSTEM CHANNEL LINK

(75) Inventors: Casimer M. DeCusatis, Poughkeepsie, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 11/314,261

(22) Filed: Dec. 21, 2005

(65) Prior Publication Data

US 2007/0140696 A1    Jun. 21, 2007

(51) Int. Cl.
H04J 14/02   (2006.01)
H04J 14/08   (2006.01)
H04B 10/08   (2006.01)

(52) U.S. Cl. .............................. 398/75; 398/17; 398/30; 398/34; 398/35; 398/74; 398/98

(58) Field of Classification Search .................... 398/30, 398/34, 35, 74, 75, 98, 17, 25
See application file for complete search history.

(56) References Cited

U.S. PATENT DOCUMENTS

| | | | |
|---|---|---|---|
| 5,136,410 A | 8/1992 | Heiling et al. | 359/110 |
| 5,357,608 A | 10/1994 | Bartow et al. | |
| 5,428,649 A | 6/1995 | Cecchi | |
| 5,483,527 A | 1/1996 | Doshi et al. | |
| 5,504,611 A | 4/1996 | Carbone, Jr. et al. | 359/177 |
| 5,610,945 A | 3/1997 | Gregg et al. | |
| 5,642,217 A | 6/1997 | Carbone, Jr. et al. | |
| 5,784,371 A | 7/1998 | Iwai | |
| 5,841,557 A | 11/1998 | Otsuka et al. | 359/122 |

(Continued)

FOREIGN PATENT DOCUMENTS

WO   WO 2007071586 A1   6/2007

OTHER PUBLICATIONS

Hung et al. "An Optical Sampled Subcarrier Multiplexing Scheme for Nonlinear Distortion Reduction in Lightwave CATV Networks", GLOBECOM '02, IEEE Global Telecommunications Conference, Nov. 2002, pp. 2828-2831.

(Continued)

*Primary Examiner*—Li Liu
(74) *Attorney, Agent, or Firm*—Steven Chiu

(57) ABSTRACT

A method and apparatus for transmitting signals from a plurality of input channels over a TDM optical network, where each of the input channels contains an optical data signal and an electrical control signal containing control information relating to the optical data signal. In accordance with the invention, respective optical receivers convert the optical data signals to respective electrical data signals, which a TDM data multiplexer time-multiplexes to generate a multiplexed data signal. A TDM control signal multiplexer time-multiplexes the electrical control signals to generate a multiplexed control signal that is combined with said multiplexed data signal to generate a composite electrical signal. An optical transmitter generates a composite optical signal from the composite electrical signal that is transmitted over the network, optionally after WDM multiplexing it with other composite optical signals. The corresponding reverse operations are performed at the receiving end to regenerate the original data and control signals.

6 Claims, 9 Drawing Sheets

U.S. PATENT DOCUMENTS

| | | | |
|---|---|---|---|
| 5,887,039 A * | 3/1999 | Suemura et al. | 375/365 |
| 5,896,211 A * | 4/1999 | Watanabe | 398/76 |
| 5,905,585 A | 5/1999 | Shirai | |
| 6,111,897 A | 8/2000 | Moon | |
| 6,151,336 A | 11/2000 | Cheng et al. | |
| 6,226,296 B1 | 5/2001 | Lindsey et al. | |
| 6,356,367 B1 | 3/2002 | DeCusatis et al. | 359/110 |
| 6,359,709 B1 | 3/2002 | DeCusatis et al. | 359/110 |
| 6,359,713 B1 | 3/2002 | DeCusatis et al. | 359/179 |
| 6,438,285 B1 | 8/2002 | DeCusatis et al. | 385/24 |
| 6,587,615 B1 | 7/2003 | Paiam | 385/24 |
| 6,798,781 B1 * | 9/2004 | Hill | 370/398 |
| 7,020,697 B1 | 3/2006 | Goodman et al. | |
| 7,272,320 B2 | 9/2007 | DeCusatis et al. | |
| 7,596,321 B2 | 9/2009 | DeCusatis et al. | |
| 2002/0027687 A1* | 3/2002 | Horlyck | 359/134 |
| 2002/0191250 A1 | 12/2002 | Graves et al. | |
| 2003/0016629 A1 | 1/2003 | Bender et al. | |
| 2003/0072516 A1 | 4/2003 | DeCusatis et al. | 385/15 |
| 2003/0081294 A1 | 5/2003 | Lee | 359/172 |
| 2003/0099013 A1* | 5/2003 | Su et al. | 359/124 |
| 2004/0184806 A1* | 9/2004 | Lee et al. | 398/79 |
| 2005/0100337 A1 | 5/2005 | DeCusatis et al. | 398/75 |
| 2005/0175341 A1 | 8/2005 | Ovadia | |
| 2006/0008276 A1* | 1/2006 | Sakai et al. | 398/141 |
| 2006/0018334 A1* | 1/2006 | Cho et al. | 370/432 |
| 2006/0018659 A1 | 1/2006 | Sekine et al. | |

OTHER PUBLICATIONS

Metod Lebar "Increasing the Productivity of Existing Fiber", Communications Engineering & Design, Jan. 2002, pp. 1-3.

"TimePilot—Time Division Multiplexer 4-1", Controlware GmbH, 2002, pp. 1-6.

Anita Karve "Wave Division Multiplexing", Network Magazine, Aug. 1999, pp. 1-4.

CMX-IG2/CMX-G2 Fiber Channel/Gigabit Ethernet Multiplexer 2-Channel Multiplexer Card, pp. 1-2, Apr. 2003.

"Cisco ONS 15200 and ONS 15454: The Metro DWDM and Next-Generation Transport Solution", pp. 1-6, Aug. 2002.

* cited by examiner

OPEN FIBER CONTROL AND LOSS OF LIGHT PROPAGATION IN TIME DIVISION MULTIPLEXED INTER-SYSTEM CHANNEL LINK

CROSS-REFERENCE TO RELATED APPLICATIONS

This application is related to the commonly owned, concurrently filed application of the same inventors, Ser. No. 11/314,382, entitled "Method and Apparatus for Initializing an End-to-End link in a Fiber Optic Communications System".

BACKGROUND OF THE INVENTION

1. Field of the Invention

This invention applies to fiber optic networks that use a combination of time and wavelength division multiplexing and transport communication protocols that require either loss of light (LOL), open fiber control (OFC), or a combination of the two states to be transported across the network.

2. Description of the Related Art

Recent advances in fiber optic dense wavelength division multiplexing (DWDM) equipment have made more efficient use of the fiber's available bandwidth by using a combination of wavelength division multiplexing (WDM) and time division multiplexing (TDM). Typically, in a TDM/WDM system, multiple input signals with data rates up to 1-2 gigabits/second (Gbit/s) are time multiplexed into a single, high-speed data stream. This is then modulated onto one of the optical wavelengths in a wavelength division multiplexing (WDM) network, which may be operating at 10 Gbit/s or faster. This approach provides a cost-effective way to scale the capacity of an optical network and is currently being applied to industry-standard protocols such as Gigabit Ethernet, Fibre Channel, Asynchronous Transfer Mode (ATM), and others.

Some data communication protocols require special accommodations to operate in this environment. For example, IBM has developed a set of protocols known as Inter-System Channel (ISC) links, which are used for clustering of mainframe computers in a Geographically Dispersed Parallel Sysplex (GDPS) architecture. (Geographically Dispersed Parallel Sysplex and GDPS are trademarks of IBM Corporation.) This approach is used for high availability and disaster recovery at larger companies worldwide and requires the extension of ISC links over DWDM networks to distances of 50-100 kilometers (km) or more. Until recently, there was no need to time multiplex the ISC channels, as the maximum data rate per wavelength in a WDM network was about 2.5 Gbit/s, approximately the same as an ISC channel. (These channels can operate in either peer mode at 2.125 Gbit/s or compatibility mode at 1.0625 Gbit/s; the compatibility mode links also use a version of open fiber control (OFC) protocols.) With the recent increase in WDM per wavelength data rates to 10 Gbit/s and beyond, it is necessary to find a method for time multiplexing several ISC channels over a common wavelength so that the GDPS architecture remains cost competitive.

This operation requires two essential steps. The first is a method for speed matching the FIFO buffers between the ISC channel and the WDM network. This requires knowledge of IBM data frame structures, and algorithms to accomplish this are described in U.S. Patent Application Publication 2005/0100337 (DeCusatis et al.), incorporated herein by reference. The second essential step is to accommodate time multiplexing of the channel initialization and control information, including open fiber control (OFC) and loss of light (LOL) propagation.

OFC is described in U.S. Pat. Nos. 6,356,367, 6,359,709 and 6,359,713 (DeCusatis et al.), as well as in U.S. Pat. No. 6,438,285 (DeCusatis et al) and U.S. Patent Application Publication 2003/0072516 (DeCusatis et al.), all of which are incorporated herein by reference. As explained in the referenced patent application publication, OFC is a laser eye safety interlock implemented in the transceiver hardware; a pair of transceivers connected by a point-to-point link must perform a handshake sequence in order to initialize the link before data transmission occurs. Only after this handshake is complete will the lasers turn on at full optical power. If the link is opened for any reason (such as a broken fiber or unplugged connector), the link detects this and automatically deactivates the lasers on both ends to prevent exposure to hazardous optical power levels. When the link is closed again, the hardware automatically detects this condition and reestablishes the link. OFC is defined for various laser wavelengths and data rates in the ANSI Fibre Channel Standard; the OFC timing and state machine are also defined in this standard. OFC is still required to interoperate with other devices attached to the fiber links, even where it no longer serves a laser safety function.

LOL is described in the above-identified U.S. Pat. Nos. 6,356,367, 6,359,709 and 6,359,713 and U.S. Patent Application Publication 2003/0072516, as well as in such patents as U.S. Pat. No. 5,504,611 (Carbone et al.) and U.S. Pat. No. 5,136,410 (Heiling et al.), incorporated herein by reference. Even links that do not implement OFC protocols must sometimes propagate a loss of light (LOL) condition along the length of the fiber. As explained in the referenced patent application publication 2003/0072516, propagating loss of light is not the same as sending a long string of zero data on the link; the attached computer equipment must be able to determine the difference between an open optical connection and a long run of zeros (potentially corrupted data) since the error recovery is different in each case.

The present invention addresses these two critical link states, LOL and OFC, which must be propagated through a TDM/WDM network to insure proper functionality of an ISC channel.

Previously, this control information was passed across WDM networks on a per-wavelength optical supervisory channel (OSC). This is illustrated in FIG. 1, which shows a prior art system 100 containing a WDM transmitting node 102 and a WDM receiving node 104 coupled via a network 106. (This example has been simplified somewhat, since each of the node 102 and 104 contains both transmitting and receiving functions.)

Transmitting node 102 contains a plurality of input channels, each of which drives a common WDM multiplexer 120. In each of these input channels, an optical signal 108 on a link from a client (not shown) drives an optical-to-electrical (OE) transducer or optical receiver (RX) 110 to produce an electrical output signal 112. This electrical signal 112 is combined with an electrical overhead control signal 114 and the result fed to an electrical-to-optical (EO) transducer or optical transmitter (TX) 116. Transducer 116 has an internal laser (not separately shown) that provides an optical signal 118 of a particular wavelength to WDM multiplexer 120. WDM multiplexer 120 combines the optical signals 118 from all of these input channels (which have different wavelengths) to provide a single multiple-wavelength optical output signal 122 to the network 106.

Correspondingly, at the receiving node 104, a WDM demultiplexer 126 takes a multiple-wavelength optical input signal 124 from the network 106 and separates it into multiple optical signals 128 of different wavelengths that are processed in respective output channels. In each of these output channels, an optical receiver 130 converts the optical signal 128 to an electrical signal 132, from which an overhead control signal 134 is extracted using well-known techniques. Finally, an optical transmitter 136 takes the electrical signal 132 from which the control signal was 134 extracted and, using another internal laser, converts it to an optical output signal 138 corresponding to the original input signal 108.

In the system 100 illustrated in FIG. 1, an input optical data stream 108 is converted into electrical form 112, then remodulated onto another laser signal 118 whose wavelength is compatible with the WDM network 106. In the process, overhead bits 114 that carry network management information for this wavelength are added to the data flow. This overhead channel does not occupy a significant fraction of the available bandwidth (perhaps a few percent), and is confined within the WDM network 106; it is stripped off by the receiver function at the destination WDM node 104. In this manner, if there is a fiber or component failure anywhere in the link, the WDM equipment can deactivate both its network laser connection and client laser connection. Similarly, if the link is equipped with OFC protocols, the entire optical link can be deactivated until the failure is corrected; at that time, OFC automatically reinitializes the end-to-end link. Otherwise, the WDM interface transparently passes along any input data to the output node.

This approach cannot be used, however, if one plans to time multiplex several channels of ISC traffic. In this latter scenario, let us consider, for example, LOL propagation. If there is an equipment failure in the TDM stage that affects only one ISC channel, it is no longer possible to disable the lasers throughout the link, since they are still carrying ISC traffic for other input channels. It is also not possible to simply transmit all zeros. This is true for many reasons, including the fact that such a transmission would violate disparity on the ISC link. It would be misinterpreted as a data error and inhibit proper channel error recovery, and the clock recovery circuits in the receiver would drift out of lock under these conditions. Similar considerations apply to OFC propagation when time multiplexing several channels of ISC traffic.

Previously, there have been various efforts to multiplex various communication protocols in optical networks. The following patents are representative.

U.S. Pat. No. 6,587,615 (Paiam) describes an optical wavelength demultiplexer with a substantially flat output response within its passband. This is accomplished by using a two-stage optical wavelength multiplexing process, in which the first WDM has a free spectral range approximately equal to the second WDM. Various embodiments are described, including resonant optical cavities, array waveguide gratings, and others. This patent only addresses the optical spectral properties of a WDM system. It does not incorporate time division multiplexing technology and does not address LOL or OFC state propagation across a network.

U.S. Pat. No. 5,814,557 (Otsuka et al.) describes a method and apparatus for scrambling the polarization of optical signals in a WDM system to suppress nonlinear effects and improve transmission fidelity. Various embodiments are proposed, including per wavelength polarization scramblers and a two-stage wavelength combination scheme with a scrambling stage in between. This patent only addresses the nonlinear effects in a long-haul WDM system that can arise from variations in the optical polarization. It does not incorporate time division multiplexing technology and does not address LOL or OFC state propagation across a network.

U.S. Patent Publication 2003/0081294 (Lee et al.) describes a free-space WDM system which couples the received channels into an optical fiber to facilitate the use of optical amplifiers. A light beam emitting and focusing unit is described to facilitate this coupling, which includes an optical circulator, WDM coupler, and amplified spontaneous emission fibers. This patent does not incorporate time division multiplexing technology and does not address LOL or OFC state propagation across a network.

The above-mentioned family of patents U.S. Pat. Nos. 6,359,709, 6,359,713 and 6,356,367 describe a method, apparatus, and computer program product for a fiber optic network that allow OFC conditions to propagate across a WDM network. This is accomplished by using an outband signal which carries the OFC state; an alternative embodiment using an electrical wrap mode is also presented. The technology described in these patents only applies to a WDM system, without TDM, and is not extendable to include TDM systems. In fact, the approach described in these patents will not work in a TDM environment. Thus, the patents describe using a per wavelength control channel to propagate OFC state information, which means that only one data channel per wavelength can be supported. These patents also do not address LOL propagation across a WDM or TDM network.

SUMMARY OF THE INVENTION

The shortcomings of the prior art are overcome and additional advantages are provided through the present invention, which relates to a method and apparatus for propagating link state conditions across an optical network. Some of the more significant aspects of our invention include the following:

One aspect of our invention, which is the subject of the present application, relates to the transport of an Inter-System Channel (ISC) or similar protocol across an optical network which uses time division multiplexing (TDM) stages, typically in combination with wavelength division multiplexing (WDM) stages. As noted above, it is necessary to correctly propagate link conditions such as a loss of light (LOL) condition across each TDM subchannel within a single WDM wavelength where WDM is used. This aspect of the invention, therefore, contemplates a control channel for each TDM subchannel to carry this information, with the control channels being time multiplexed in the same fashion as the data.

More formally, this aspect of the invention contemplates a method and apparatus for transmitting signals from a plurality of input channels over a TDM optical network, where each of the input channels contains an optical data signal and an electrical control signal containing control information relating to the optical data signal. In accordance with the invention, respective optical receivers convert the optical data signals to respective electrical data signals, which a TDM data multiplexer time-multiplexes to generate a multiplexed data signal. A TDM control signal multiplexer time-multiplexes the electrical control signals to generate a multiplexed control signal that is combined with said multiplexed data signal to generate a composite electrical signal. An optical transmitter generates a composite optical signal from the composite electrical signal that is transmitted over the network.

At the receiving end, an optical receiver receives the composite optical signal over the network and generates a composite electrical signal from the composite optical signal that is separable into a multiplexed data signal and a multiplexed control signal. A TDM data demultiplexer demultiplexes the multiplexed data signal to generate respective electrical data signals for output channels corresponding to the input channels, while a TDM control signal demultiplexer demultiplexes the multiplexed control signal to generate respective electrical control signals for the output channels. Finally, respective optical transmitters convert the electrical data signals to optical data signals for the output channels.

In the system described, in response to detecting a loss of an optical data signal in one of the input channels, an electrical control signal is generated for that input channel indicating the loss of the optical data signal. That control signal will be propagated to the appropriate output channel by virtue of the signal handling described above.

If desired, the invention may be used in a TDM/WDM system in which a WDM multiplexer combines the composite optical signal with one or more other composite optical signals of different wavelengths before being transmitted over the network. In such case, a WDM demultiplexer separates the received composite optical signal into composite optical signals of different wavelengths, each of which is fed to an optical receiver to generate a composite electrical signal from which individual data signals and control signals are generated for output channels in the manner described above.

More particularly, in accordance with this aspect of the present invention, each input channel (e.g., an ISC input channel) has its own dedicated overhead control channel that is distinguished (e.g., by an identifier) from control channels for other input channels in the same TDM block. These control channels are time multiplexed to yield a single control channel for each optical wavelength, compatible with the previously established approach. These control channels are operational regardless of whether any data is actually being transmitted across the links. Any equipment or link failures that produce loss of light will now be recognized at the next downstream element, and the TDM (including TDM/WDM) equipment can insert a control character for the affected channel that is recognized by the other WDM nodes.

Another aspect of our invention, which is a subject of the above-identified concurrently filed application, relates to a method and apparatus for propagating an open fiber control (OFC) condition across a hybrid TDM/WDM network. Disclosed are a peer-to-peer embodiment and a master-slave embodiment for propagating OFC across a hybrid TDM/WDM network.

More formally, this aspect of the invention contemplates a method and apparatus for initializing an end-to-end link in a fiber optic communications system in which a pair of nodes interconnect a pair of end devices. The nodes are coupled to the end devices via respective device link segments and are coupled to each other via a network link segment, the device link segments and the network link segment together forming an end-to-end link. In accordance with the invention, a first node initializes the device link segment with the end device to which the node is coupled. Upon initializing that device link segment, the first node sends a signal to the other node over the network link segment indicating that the sending node has initialized its device link segment. The first node completes initialization of the end-to-end link upon receiving a signal from the other node over the network link segment indicating that the other node has initialized its device link segment.

The first node may disable the device link segment with the end device to which the node is coupled and return to the initializing step upon a failure of the other node to initialize its device link segment. This disablement may be performed upon a failure to receive a signal from the other node within a predetermined time period indicating that the other node has initialized its device link segment. Alternatively, this disablement may be performed upon receiving a signal from the other node indicating that the other node has not initialized its device link segment.

The initialization steps may be performed by each of the nodes as a peer of the other node. Alternatively, the steps may be performed by one of said nodes as a master node which, upon initializing its device link segment, signals the other node to perform its own initialization procedure as a slave node. Such slave node, upon being signaled by the master node, initializes the device link segment with the end device to which the slave node is coupled and, upon initializing that device link segment, sends a signal to the master node over the network link segment indicating that the slave node has initialized its device link segment.

Yet another aspect of our invention, which is also a subject of the above-identified concurrently filed application, relates to a method and apparatus for propagating an OFC state across a hybrid TDM/WDM network that does not require the end nodes in the network to generate OFC-compliant signals. Rather, this aspect of the invention uses an algorithm for handling the OFC signals generated by the end devices attached to the network, as described further below.

More formally, this aspect of the invention contemplates a method for initializing an end-to-end link in accordance with a predetermined protocol in a fiber optic communications system in which a pair of nodes interconnect a pair of end devices. Each of the end devices is capable of initializing a link segment between it and a similar device according to a predetermined protocol. The nodes have respective device ports coupled to the end devices via respective device link segments, respective network ports coupled to each other via a network link segment, and respective data channels extending between the device ports and the network ports, the device link segments and the network link segment together forming an end-to-end link.

In accordance with the invention, as performed by one of said nodes, the data channel is normally operated in a transparent mode in which an optical signal received at the device port is retransmitted from the network port, while an optical signal received at the network port is retransmitted from the device port. In response to detecting a predetermined link state at said device port, however, the data channel is momentarily operated in a loopback mode, in which an optical signal received at the device port is also looped back to the device link segment from the device port while being retransmitted from the network port, thereby allowing the end device to initialize the device link segment in accordance with the predetermined protocol, then returning to the transparent mode. More particularly, if the device port comprises an optical transmitter and an optical receiver, the predetermined link state comprises the absence of a signal from said optical receiver together with the presence of a signal to the optical transmitter.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description below explains the preferred embodiments of the invention, together with advantages and features, by way of example with reference to the drawings.

DETAILED DESCRIPTION OF THE INVENTION

Figure 1:
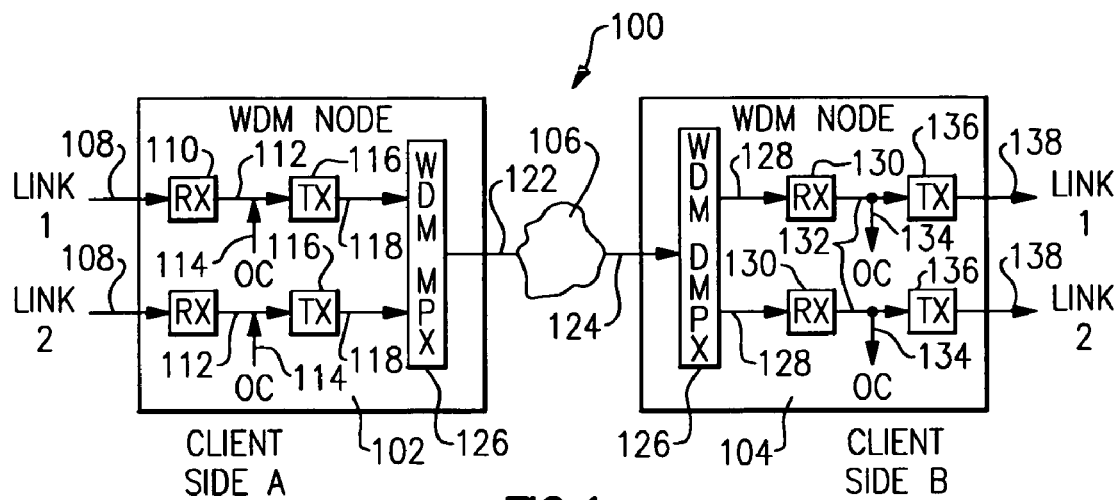
FIG. 1 shows the prior art in which a dedicated control channel is used for each optical wavelength in a WDM network.
Figure 2:
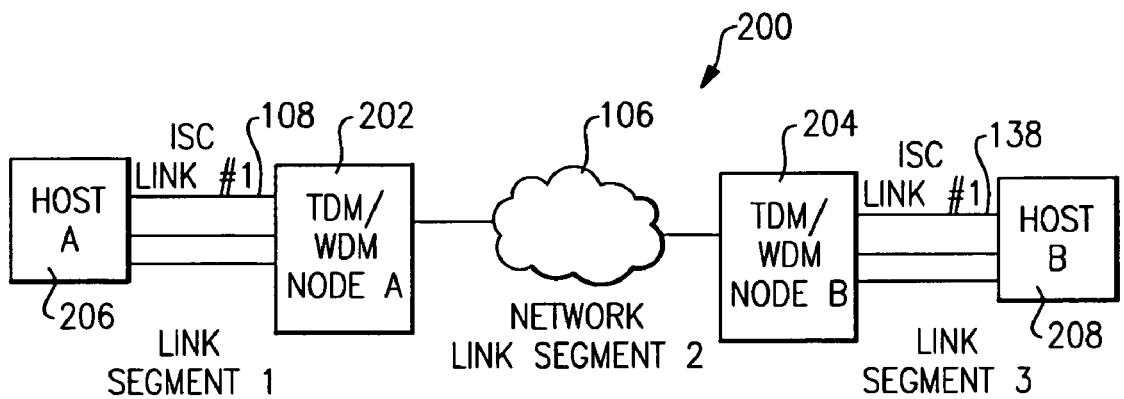
FIG. 2 shows the network environment in which multiple TDM and WDM channels are propagated across a network.
Figure 3:
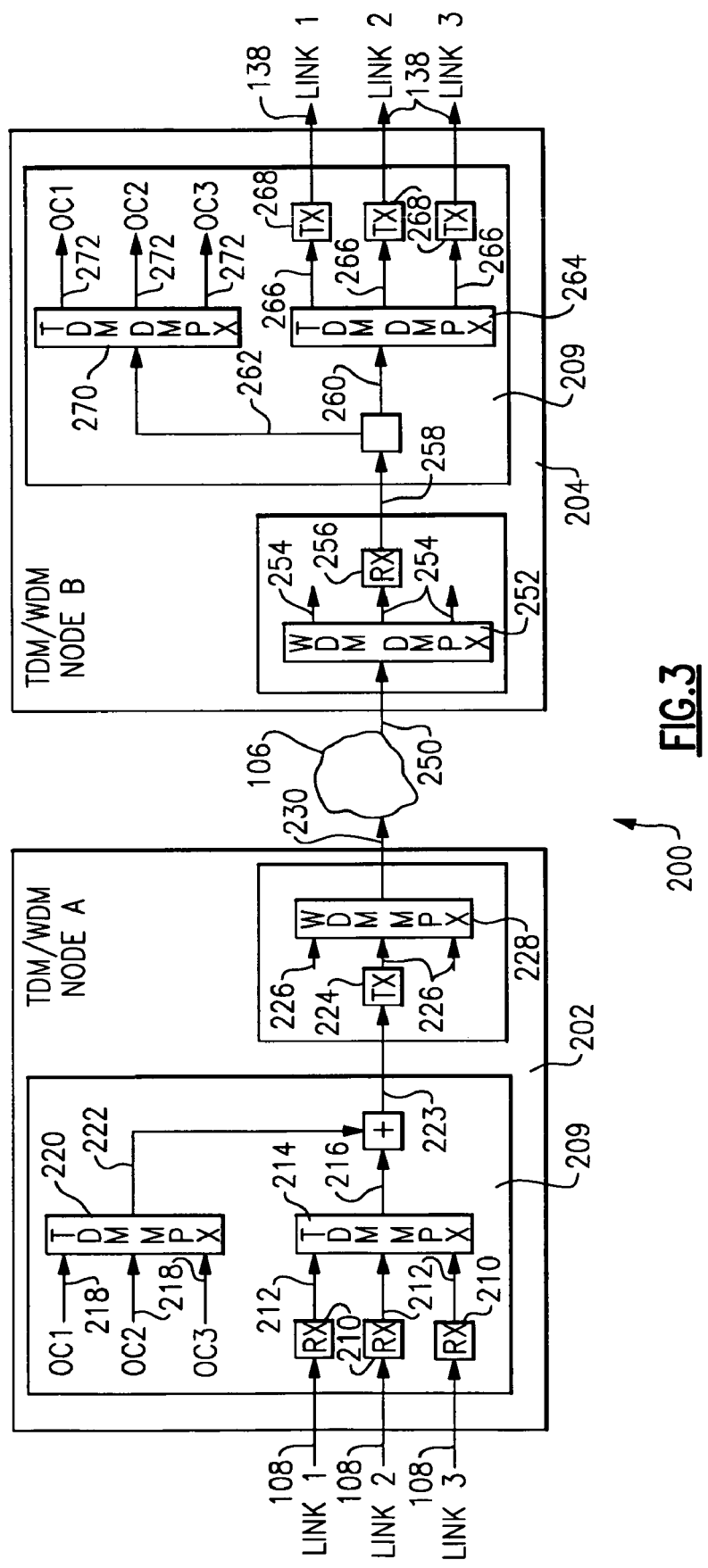
FIG. 3 shows an embodiment of this invention in which the control channels for multiple TDM data channels are combined into a single TDM channel for transport across the network shown in FIG. 2.

FIGS. 2 and 3 show one embodiment of the present invention, in which control channels for multiple TDM data channels are combined into a single TDM channel for transport across a network. More particularly, FIG. 2 shows an end-to-end system containing a pair of such nodes coupled over a network, while FIG. 3 shows the transmitter and receiver portions of those nodes.

Referring first to FIG. 2, that figure shows a system 200 containing a first TDM/WDM node 202 (node A) interconnecting a first host system 206 (host A) and the network 106 and a second TDM/WDM node 204 (node B) interconnecting the network and a second host system 208 (host B). In the discussion that follows, reference is made to transmitter functions in node 202 and to receiver functions in node 204. Each node, of course, contains both functions, which form the two halves of a duplex link.

Referring now to FIG. 3, the transmitter portion of the first node 202 contains a plurality of TDM channels 209, each of which operates at a different wavelength and one of which is shown. Each TDM channel 209 typically resides on a separate card and services one or more input channels. Each input channel serviced by a TDM channel 209 of the transmitter has an input optical data signal 108 driving an optical receiver 210 to produce an electrical data signal 212, as was shown for system 100 above. Here, however, each of these electrical data signals 212 is then fed to a first TDM multiplexer (MPX) 214, which combines the data signals 212 into a single multiplexed data signal 216. Additionally, an overhead control signal 218 (OC1-OC3) for each of the input channels serviced by the TDM channel 209 is fed to a second TDM multiplexer 220, which combines the control signals 218 into a single multiplexed control signal 222. Multiplexed data signal 216 and control signal 222 are then combined to produce a single composite electrical signal 223. This composite electrical signal is then fed to an optical transmitter 224, which provides (via an internal laser) a composite optical signal 226 of a particular wavelength to WDM multiplexer 228. WDM multiplexer 228 combines this optical signal 226 together with optical signals 226 of different wavelengths from other TDM channels (not shown) to provide a single multiple-wavelength optical output signal 230 to the network 106.

FIG. 3 also shows the receiver portion of node 204, which performs a corresponding reverse sequence of operations to generate the optical signals 138 corresponding to the original optical signals 108. More particularly, a WDM demultiplexer 252 separates a multiple-wavelength optical signal 250 from the network 106 into plural single-wavelength optical signals 254 corresponding to the TDM channels 209. Each of these optical signals 254 drives an optical receiver 256, which produces a corresponding composite electrical signal 258 for that TDM channel. Each such composite electrical signal 258 is separated into a multiplexed data signal 260 and a multiplexed control signal 262. A TDM data demultiplexer 264 separates the multiplexed data signal 260 into individual data signals 266 corresponding to the output channels. Respective optical transmitters 268 convert these demultiplexed signals into the desired optical signals 138. Finally, a TDM control signal demultiplexer 270 separates the multiplexed control signal 262 into individual control signals 272 (OC1-OC3) corresponding to the data signals 266.

To see how the present invention works in the system 200 shown in FIGS. 2-3, assume that the client-side input 108 is disconnected from ISC link 1. At the transmitting node 202, the optical receiver 210 forming the WDM client interface detects this, but does not disable the WDM network-side laser in optical transmitter 224. Instead, that optical receiver 210 inserts a control character indicating loss of light (LOL) onto the overhead subchannel 218 for ISC link 1. TDM multiplexer 220 time multiplexes this control character with similar control information for the other input channels, and this control information is passed through the WDM network to the receiving node 204. At the receiving node 204, the control character is stripped off the corresponding overhead control signal 272 and the WDM equipment acts to disable the client-side output laser 268 corresponding to ISC link 1, leaving the rest of the links intact and unaffected. Thus, removing a cable at the network input 108 for an ISC link results in a loss of light at the corresponding remote port 138, just as if the WDM network provided a long virtual connection between these two points; however there is no loss of light on the WDM network. A similar process propagates LOL from a failure on the output client 208 side to the input client 206 side, or from a failure in the network 106 to both client sides.

OFC Propagation

Next, consider the problem of OFC propagation in a TDM/WDM hybrid network such as the one shown in FIGS. 2 and 3.

Direct propagation of OFC signals would require very fast lasers in the TDM network to comply with OFC timing requirements and is likely not practical. While OFC is defined by the ANSI Fibre Channel standard, it is only defined for point-to-point links and not for repeated or WDM networks; it is also not defined for TDM networks. Further, a vendor may use a proprietary, nonstandard version of OFC on an ISC channel implementation to achieve longer distances. While the propagation of OFC over WDM has been addressed previously, the propagation of OFC over a combined TDM/WDM network is a different problem, which is addressed by this aspect of the invention.

Either a peer-to-peer approach or a master-slave approach may be used. Although the peer-to-peer approach is considered a preferred approach, either may be used, and both are described.

Figure 4:
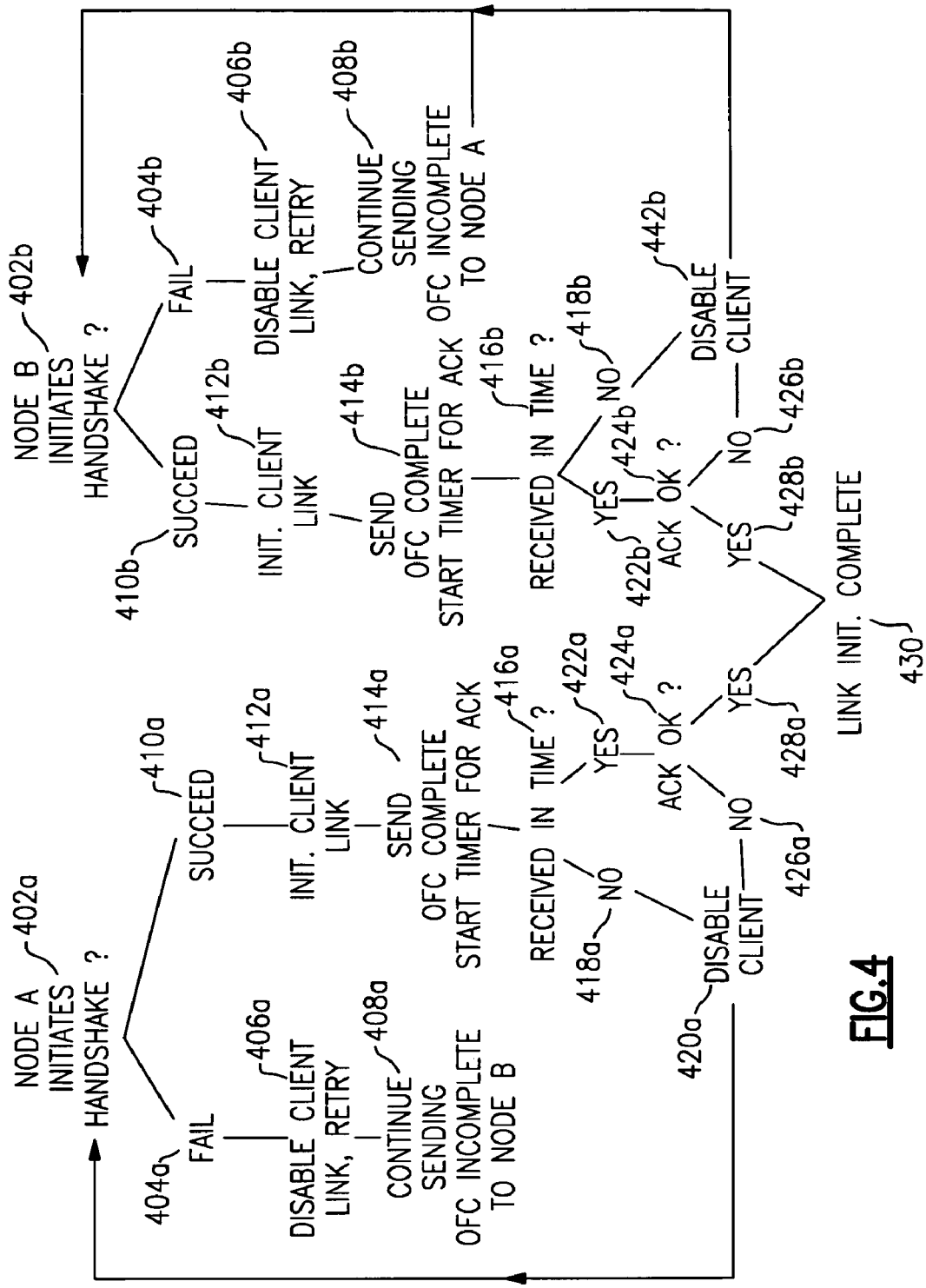
FIG. 4 shows a peer-to-peer procedure for propagating OFC states across a combined TDM/WDM network.
Figure 5:
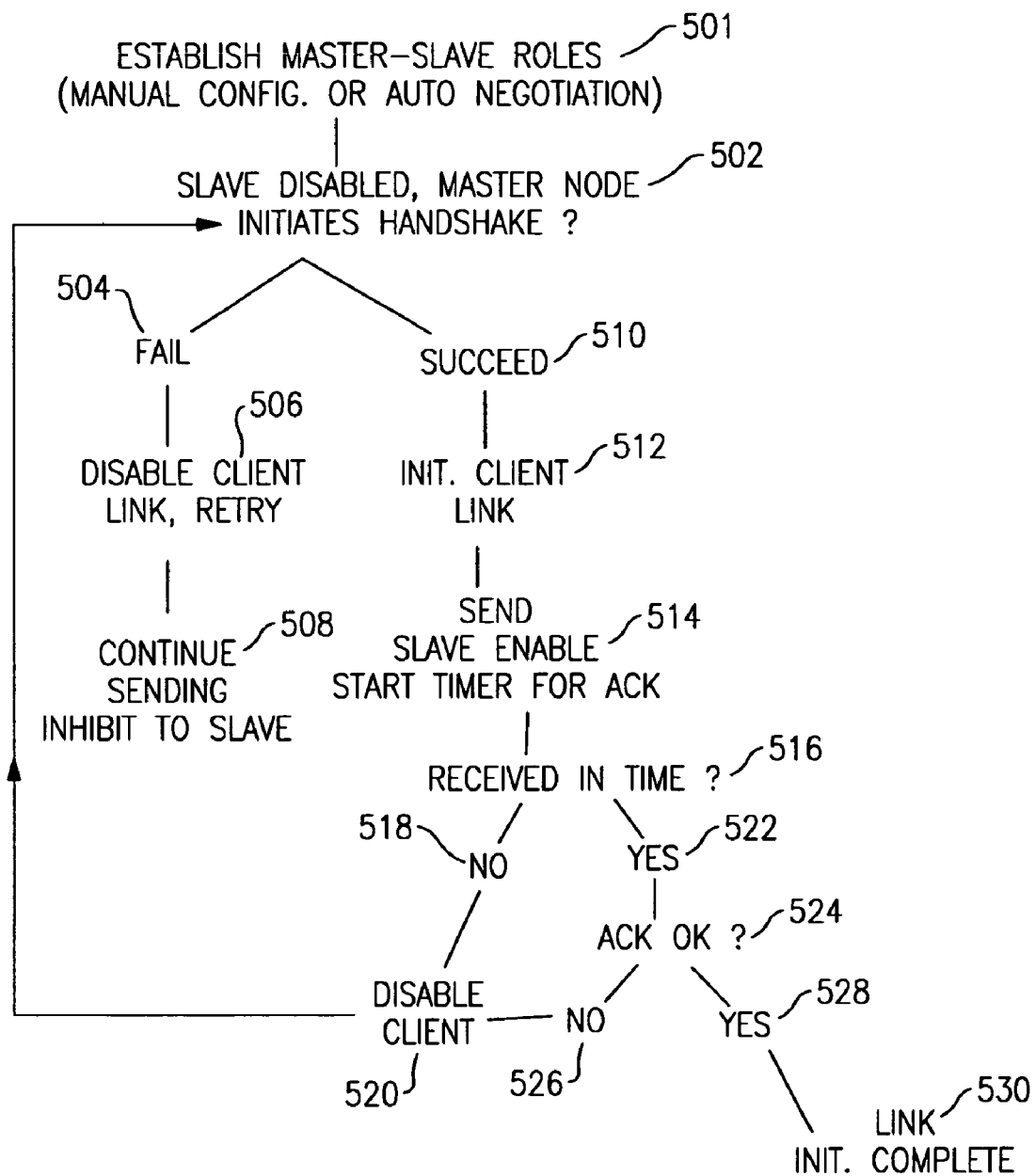
FIG. 5 shows a master-slave procedure for propagating OFC states across a combined TDM/WDM network.

The peer-to-peer approach is illustrated by the algorithm and flow chart in FIG. 4. Each of a pair of interconnected nodes, acting as a peer, follows the same procedure, which will be described as it is performed by node A. Each of nodes 202 and 204 contains suitable logic for performing this procedure (and that of FIG. 5), such as the logic 630 shown in FIG. 6.

Referring now to FIGS. 2-4, when an end-to-end ISC link (e.g., ISC link 1) is first created, hosts 206 (A) and 208 (B) on both sides of the network link 106 independently attempt to initiate an OFC handshake with their respective TDM/WDM nodes 202 (A) and 204 (B). First, consider the handshake on side A. As shown in FIG. 4, node 202 (A) first attempts to initiate a handshake with host 206 (A) (step 402a). If the handshake attempt fails (step 404a), node 202 disables link segment 1 (connecting host 206 and node 202) and retries the handshake (step 406a), while at the same time continuing to send an "OFC incomplete" message it has been sending to the other node 204 (B) (step 408a).

If, on a first or subsequent try, the handshake attempt is successful (step 410a), then link segment 1 (connecting host 206 and node 202) initializes (step 412a). Node 202 (A) then sends an "OFC complete" message to the other node 204 (B) and starts a timer for receiving an acknowledgment (ACK) signal from that other node, indicating that it has established a link (link segment 3) with host 208 (B) (step 414a). Node 202 sends the "OFC complete" message by inserting a control character into the subchannel 218 for ISC link 1 to reflect this state. This control character is time multiplexed into the per-wavelength control channel 222, passed through the network link 106 (constituting link segment 2), and detected at node 204 (B). Node 204 responds to node 202 with another control character, indicating whether it has completed a handshake on link segment 3 (connecting node 204 and host 208).

When the time for receiving an ACK signal has expired, node 202 (A) checks to determine whether it has received an ACK signal from node 204 (B) (step 416a). If node 202 has not received a timely ACK signal (step 418a), then node 202 forces a disconnect on link 1 by dropping its client-side laser signal (from a transmitter similar to the transmitter 268 shown in FIG. 3) (step 420a), then returns to step 402a. If node 202 does receive a timely ACK signal from node 204 (B) (step 422a), it checks to determine whether that signal indicates that the latter has established a link over link segment 3 with host 208 (B) (step 424a). If the ACK signal does not indicate initialization of link segment 3 (step 426a), then node 202 likewise forces a disconnect on link 1 (step 420a) and returns to step 402a.

If node 202 (A) does receive a timely ACK signal from node 204 (B) and that signal indicates initialization of link segment 3 (step 428a), then node 202 keeps link segment 1 online, since link initialization is now complete (step 430).

Recall that the same process is taking place on side B. More particularly, node 204 (B) executes a series of steps 402b-428b that are identical to steps 402a-428a and will therefore not be exhaustively described. Basically, node 204 (B) attempts to handshake with host 208 (B) (step 402b) and, if successful (410b), link segment 3 is initialized (step 412b) and a control signal is propagated upstream to node 202 (A) (step 414b). As with node 202 (A) and link 1, node 204 (B) will only maintain link 3 if it receives a favorable acknowledgment from node 202 (step 428b); otherwise it drops link segment 3 (420b). This process continues until both node 202 and 204 have established a client-side connections and have receive acknowledgments from the opposite node; the link is then initialized end-to-end (step 430).

As a practical matter, node 202 or 204 may be configured to drop its client signal if it fails to receive any form of acknowledgment from the other node within a predetermined interval, which will depend on the latency of the WDM network. This can either be configured in software or preset to the maximum supported network latency. This step also prevents the client sides (link segments 1 and 3) from initializing in the event of a network fiber break on link segment 2 or failure in the TDM/WDM equipment.

The peer-to-peer approach is preferred because of its symmetry and ease of implementation. An alternative approach is a master-slave approach, shown in FIG. 5. The master-slave procedure is similar to the peer-to-peer procedure shown in FIG. 4, with appropriate modifications for the master-slave relationship of the two nodes. The two nodes first establish, during configuration of the TDM/WDM equipment, which node will act as the master (step 501). This can be either provisioned manually or negotiated by default settings in the equipment.

Once the master-slave relationship is established and confirmed at both ends of the network, the master controls all subsequent OFC handshaking by performing a series of steps 502-530. These steps are generally similar to the like-numbered steps in FIG. 4 performed by the separate nodes 202 and 204 (with the exceptions indicated), and are therefore not all individually described. The master node first attempts to initiate a handshake with the attached host 206 or 208, ordering the slave node (through a suitable signal over the network link segment) to remain disabled (step 502). If the handshake attempt fails (step 504), the master node disables the client link and retries the handshake (step 506), while at the same time continuing its previous action of sending an "inhibit" message to the slave node (step 508). When the master successfully completes a handshake (step 510), the master node initiates the client link (step 512), sends an "enable" message to the slave node, releasing the slave to attempt a handshake on the opposite side of the link, and starts a timer for receiving an acknowledgment (ACK) signal from the slave node (step 514).

When the slave handshake completes, it sends an acknowledgment back to the master within a predetermined timeout interval to complete the link initialization process. If the ACK signal is not received in time (steps 516 and 518), the master node disables the client (step 520) and returns to step 502 to attempt another handshake with the client. If the ACK signal is received in time (step 522) and is in proper form (steps 524 and 528), then link initiation is complete (step 530). If the ACK is not in proper form (step 526), then the master node likewise disables the client (step 520) and returns to step 502 to attempt another handshake with the client.

Note there is no need for additional handshakes to take place across the network link 106; the slave assumes that it will not be allowed to handshake until the master's handshake is completed first. There is also no need for a timeout interval on the slave side (steps 514-528) for the same reason. However, there is a tradeoff between these features and the additional complexity involved with establishing the initial master-slave relationship.

Alternative Embodiment for OFC Propagation

In addition to the embodiments described above, we propose an alternative embodiment for OFC propagation across a TDM/WDM network with duplex links. This alternative approach does not require the TDM/WDM network nodes to generate OFC handshake pulses. Rather, it operates by echoing the OFC pulses from the ISC channels back to their original source if the link conditions are suitable for link initialization, as described in more detail below.

Figure 6:
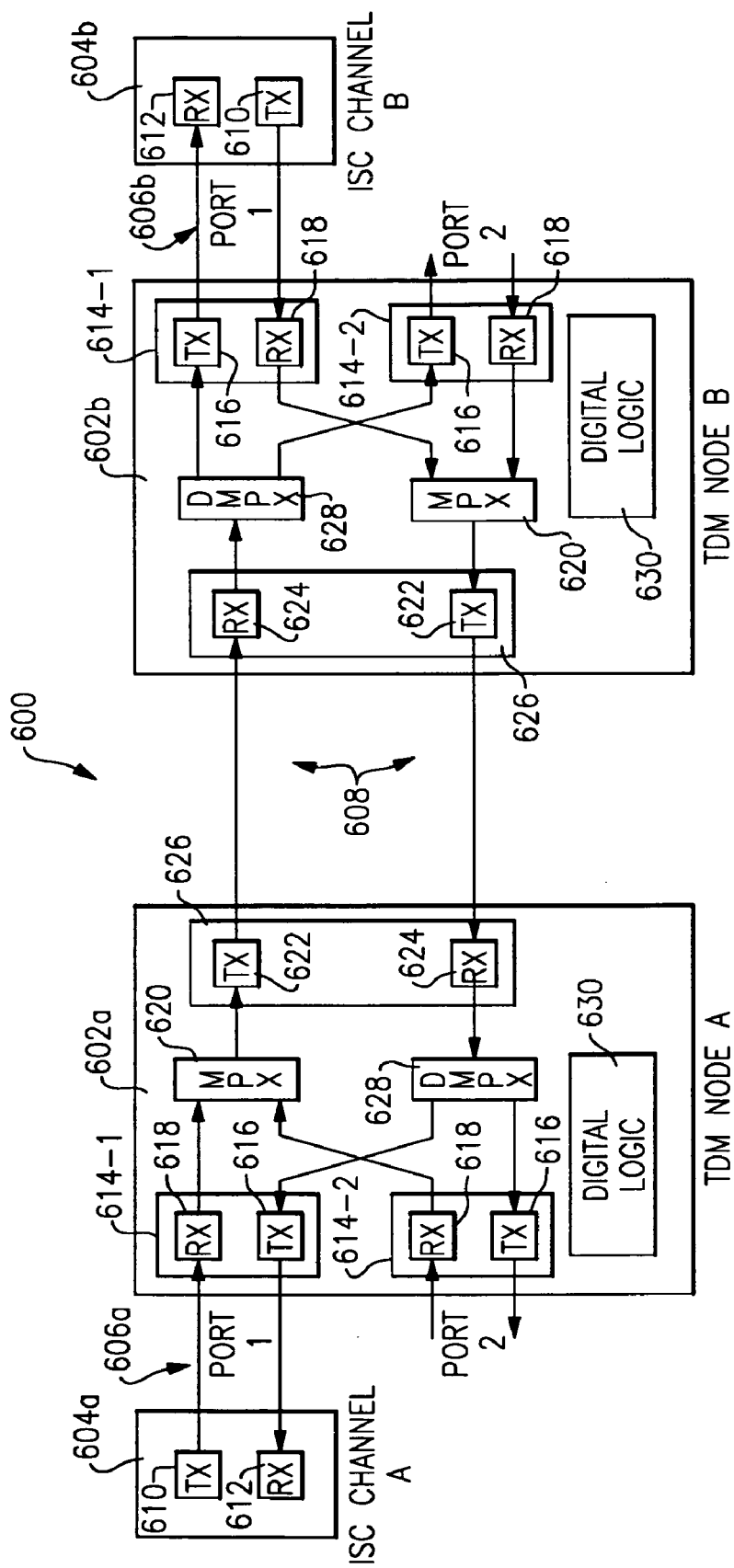
FIGS. 6-10 show an alternative embodiment for propagating OFC states across a network.

FIG. 6 shows a system 600 comprising a pair of interconnected TDM nodes 602a (node A) and 602b (node B) coupling a first ISC channel 604a (channel A) and a second ISC channel 604b (channel B). A duplex optical link 606a interconnects TDM node 602a and ISC channel 604a, while a similar duplex optical link 606b interconnects TDM node 602b and ISC channel 604b. An additional duplex optical link 608, in particular a network link, interconnects TDM nodes 602a and 602b to each other. Each of ISC channels 604a and 604b contains an optical transmitter (TX) 610 and receiver (RX) 612 and uses a predetermined protocol, such as the one defined in the ANSI standard referenced above, for exchanging OFC signals with an attached device.

For simplicity, FIG. 6 shows only one ISC channel 604 attached to each TDM node 602. However, the approach can easily be replicated for multiple channels 604 on the same TDM node 602. Further, while the approach is described for TDM signals only, it can obviously be extended to include TDM signals running over a WDM network as well. In such a TDM/WDM network, the components shown for a node 602 in FIG. 6 would correspond to a single TDM channel, with multiple TDM channels interfacing with a single WDM multiplexer and demultiplexer as shown in other embodiments above.

Each of TDM nodes 602a and 602b contains a plurality of input ports collectively indicated by the reference numeral 614, two of which, port 614-1 (port 1) and 614-2 (port 2), are shown. Each input port 614 has transmitter (TX) 616 and receiver (RX) 618 that interface with a corresponding receiver (RX) 612 and transmitter (TX) 610, respectively, of an ISC channel 604a or 604b. Each receiver 618 supplies one input to a TDM multiplexer (MPX) 620, which time multiplexes the input with inputs from the other receivers of the same node 602a or 602b. The TDM multiplexer 620 of each node 602a or 602b in turn drives a transmitter 622 coupled via link 608 to a corresponding receiver 624 in the other node, the transmitter 622 and receiver 624 of each node 602 constituting an output port 626. Each receiver 624 drives a TDM demultiplexer (DMPX) 628, which supplies demultiplexed signals to the port transmitters 616 of that node.

In operation of the system 600 described above, an optical signal originating from transmitter 610 of ISC channel 604a reaches receiver 612 of ISC channel 604b by way of link 606a, receiver 618 of input port 614-1 (of node 602a), multiplexer 620, transmitter 622, link 608, receiver 624 of node 602b, demultiplexer 628, transmitter 616 of input port 614-1 and link 606b. An optical signal originating from transmitter 610 of ISC channel 604b reaches receiver 612 of ISC channel 604a via a similar path in the other direction, and similarly for optical signals originating from other ISC channels and traversing other duplex input ports.

Most of the time, each TDM node 602 operates transparently: any input signal from an ISC channel 604 is time multiplexed and transmitted along the network link 608 to the other node, while any received TDM signal from the network link is demultiplexed and routed via an input port 614 to the appropriate ISC channel 604. In order to initialize the overall link (comprising all of the components between a pair of intercommunicating ISC channels 604) using OFC, this aspect of the present invention contemplates that a TDM node 602 operate in a non-transparent way under certain conditions. More particularly, this aspect of the present invention contemplates that logic 630 incorporated into each TDM node 602 monitor signals present at the TDM input ports 614 and the TDM output port 626, then implement a state machine that routes the handshake signals as desired. Logic 630 may be implemented in any suitable manner, such as by a special-purpose digital circuit—e.g., an application-specific integrated circuit (ASIC)—firmware (i.e., microcode) or a combination of the two.

To illustrate how this would work, first assume that ISC channel 604a is connected to TDM node 602a and initiates an OFC handshake pulse from its transmitter 610 to the port 1 receiver 618 of node 602a. Since the corresponding link 606b from ISC channel 604b is not yet active, there is no receive signal on the line from the network-side receiver 624 to the port 1 transmitter 616. (Note that there may still be signals running on other ports 614 of the TDM channel serviced by the multiplexer 620 and demultiplexer 628, and so other signals may be flowing on the transmitter and receiver links to node 602a.)

Figure 7:
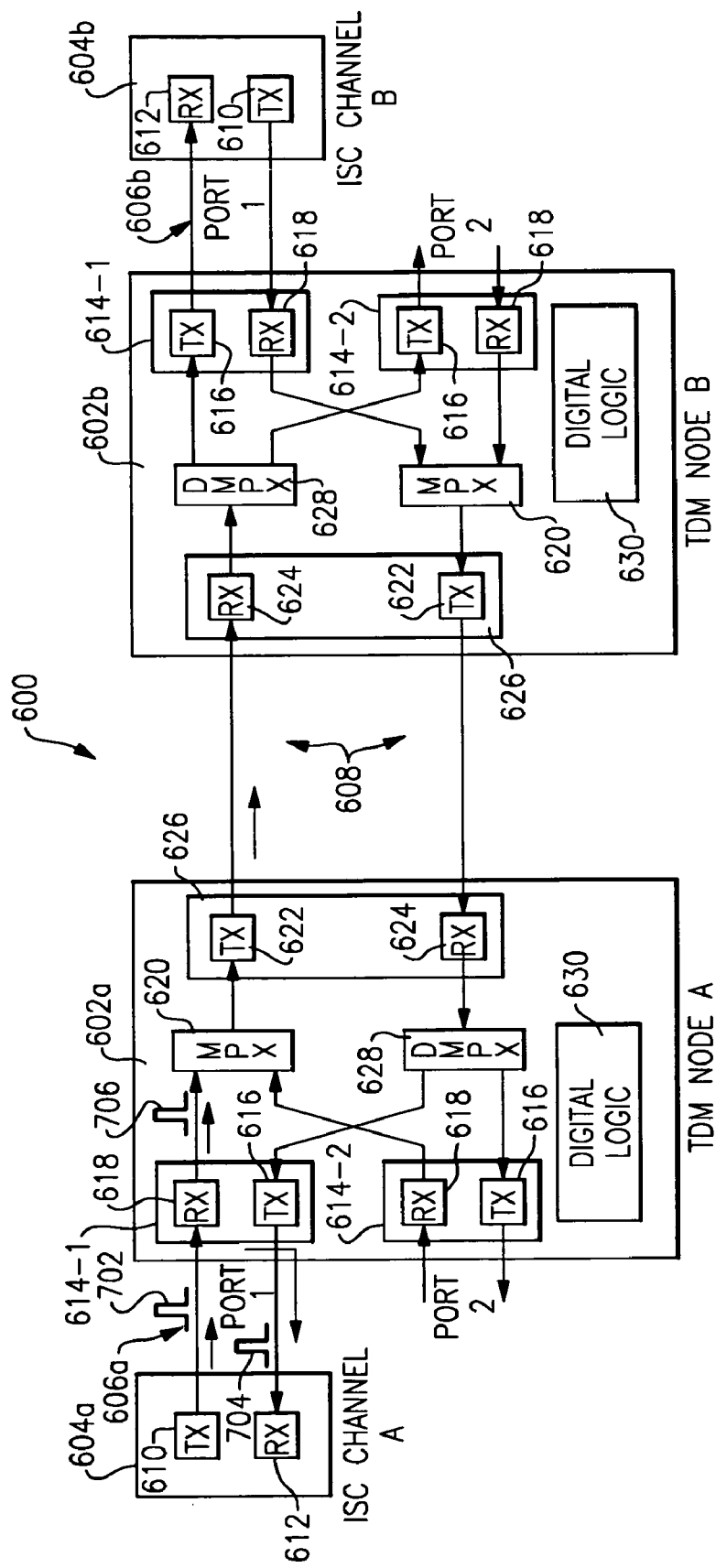
Figure 10:
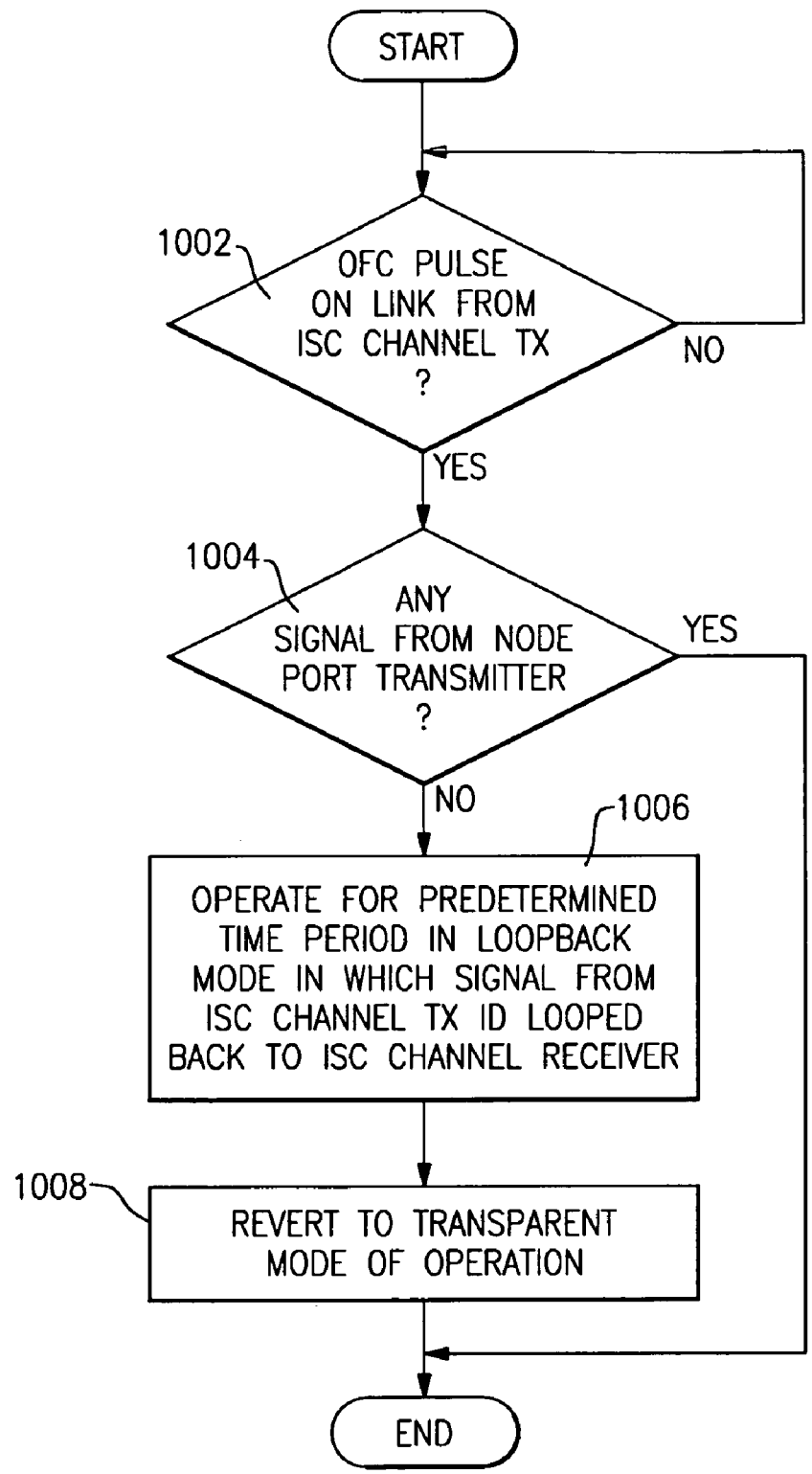

Referring now to FIG. 7 and to the flowchart of FIG. 10, this aspect of the invention comes into play when (1) the signal from an ISC channel 604 to the receiver 618 of a input port 614 of a node 602 contains an OFC pulse 702 (step 1002) and (2) the signal from the transmitter 616 of the same input port 614 is low (as indicated in the figure for input port 614-1 of node 602a) (step 1004). When these two events co-occur, the digital logic 630 at that node 602 forces the OFC signal 702 to both (1) loop back to the receiver 612 of the ISC channel 604, using transmitter 616 (as shown at 704), and (2) be transmitted from the transmitter 622 of the node 602 across the TDM link 608 (as shown as 706) (step 1006). This state is maintained at the originating node 602 for a predetermined fixed amount of time, after which the node 602 returns to a transparent state and propagates any signals it receives (step 1008). Looping the signal back to the ISC channel 604 causes the OFC handshake to complete on this channel and initializes the first link segment, in this case the segment comprising the link 606a between ICS channel 604a and node 602a.

Figure 8:
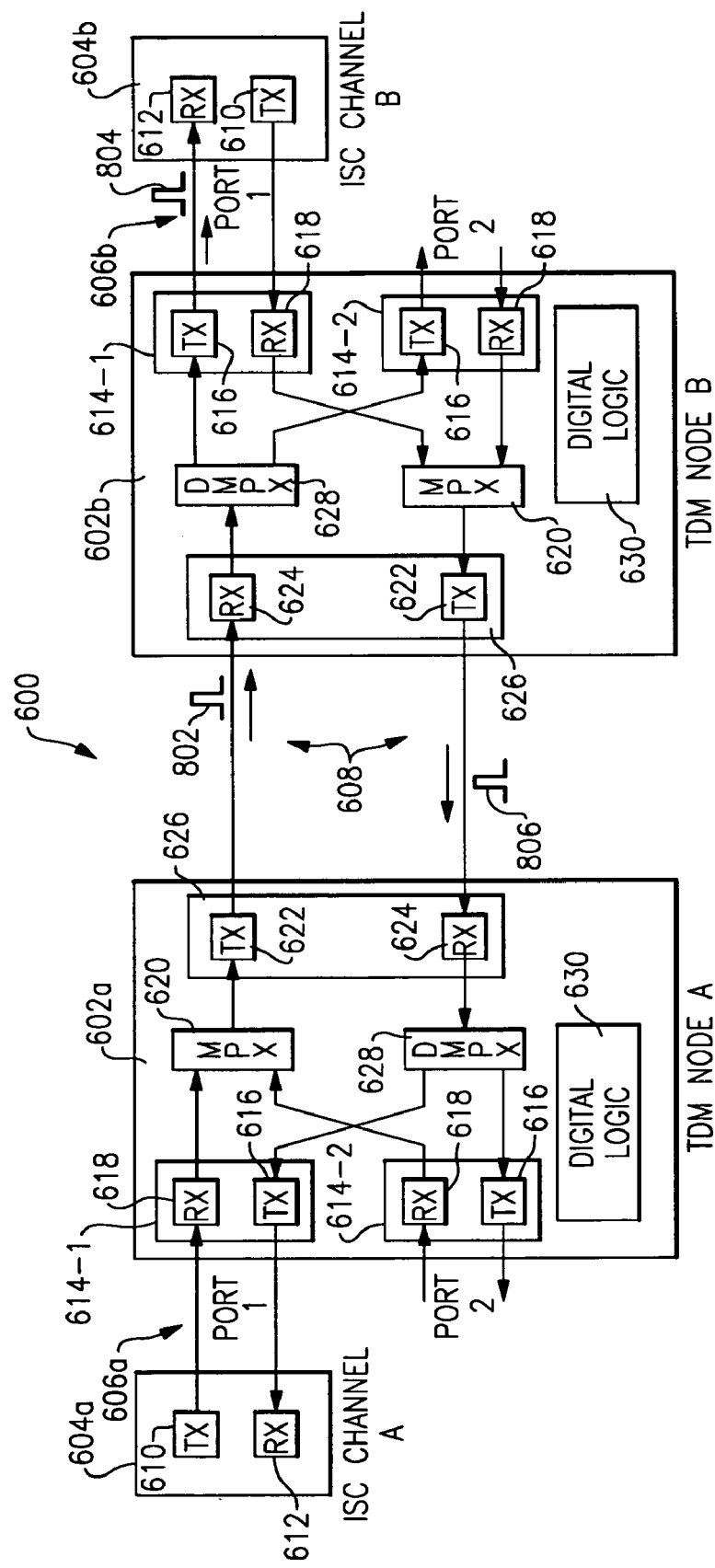

Referring now to FIG. 8, the same forwardly transmitted OFC pulse 706 (FIG. 7) is subsequently received at the other end of the network link 608 at the receiver 624 of TDM node 602b (as shown at 802). However, the receiver 618 of port 614-1 of TDM node 602b still does not have a signal. When these two signals are detected in these states, the digital logic 630 at the receiving TDM node 602b passes the OFC pulse 802 along to the receiver 612 of ISC channel 604b (as shown at 804). At the same time, it transparently passes through any signal it receives from ISC channel 604b. Upon receiving this signal 804, ISC channel 604b responds with an OFC handshake pulse 806 from its transmitter 610.

Figure 9:
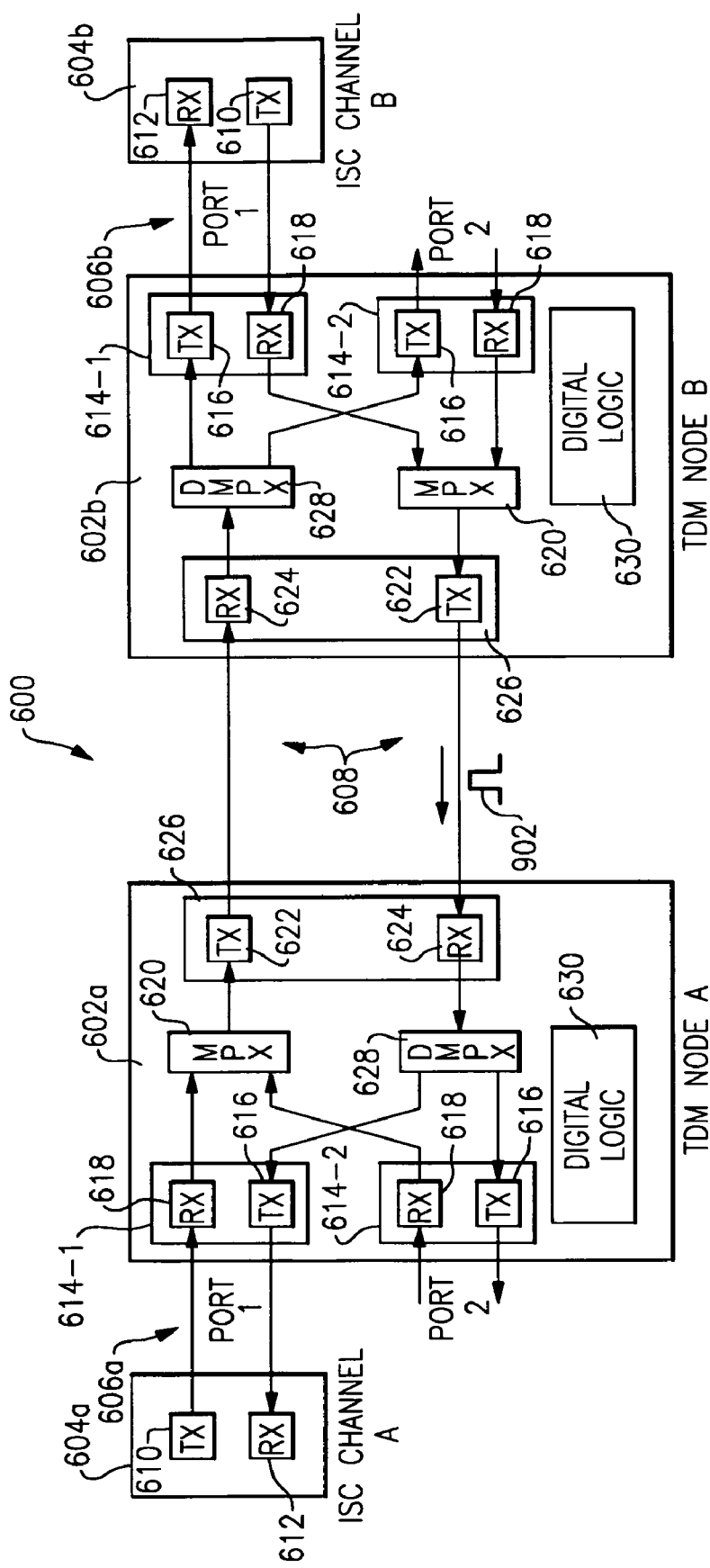

Referring now to FIG. 9, the OFC handshake pulse 806 from ISC channel 604b propagates through TDM node 602b, as shown at 902, across the network link 608 back to TDM node 602a. By this time, the time delay at node 602a has expired, so the received signal is simply passed transparently through. ISC channel 604a has in the meantime been sending optical signals, which pass transparently through TDM node 602a across the network link 608 to TDM node 602b; this is sufficient to complete the handshake at TDM node 602b. Both nodes 602a and 602b are now in transparent mode, and the link spanning ISC channels 604a and 604b has been fully initialized.

It should be apparent that the same procedure could have been followed if ISC channel 602b had been the first to initiate OFC handshaking instead of ISC channel 602a. As an additional feature, the digital logic 630 ensures that if there is an open link condition at any point in the network, nodes 602a and 602b will detect this and shut down their corresponding transmitters, interrupting data transmission. Once the link segments are deactivated, ISC channels 604a and 604b will attempt to initiate an OFC handshake every 10 seconds, in accordance with the existing OFC handshaking protocol referenced above. When the link is repaired, the procedure described above will initialize the link once again. Deadlock conditions are prevented by having each TDM node 602 check whether it is already receiving a signal from the other end of the network link 608 before using its own state machine 630 to begin the handshake process.

The embodiment described above has several potential advantages. It does not require the TDM nodes 602 to generate an OFC signal pulse, which can save on hardware if multiple ISC channels 604 are to be accommodated on a single card. Also, it does not require an optical supervisory channel to verify that the links are connected. The maximum link length, or the longest allowed round-trip delay time from node 602*a* to node 602*b* and back to node 602*a* again, is limited by the fixed delay built into the digital logic 630; the link has to establish during this time. The fixed delay must also be short enough to avoid causing error conditions at the ISC channels 604 due to the looped back signals. By selecting a fixed delay of a few milliseconds, it should be possible to extend the links beyond 100 kilometers; this delay could also be made programmable and adjusted depending on link length or other conditions. In this approach, the ISC channel 604 which first initiates a handshake becomes the master for the handshake between itself and the TDM node 602; while at the other end of the link, the other TDM node 602 acts as the master for the handshake between itself and the other ISC channel 604.

While certain features of the present invention (such as the optical transmitters and receivers) necessarily incorporate hardware, other features (such as the digital logic described above) may be implemented in firmware or some combination of hardware and firmware.

As one example, one or more aspects of the present invention can be included in an article of manufacture (e.g., one or more computer program products) having, for instance, computer usable media. The media may have embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for transmitting signals from a plurality of input channels over a Time Division Multiplexing (TDM) optical network, each of said input channels containing an optical data signal and an electrical control signal containing control information relating to said optical data signal, said method comprising the steps of:

converting said optical data signals to respective electrical data signals;

time-division multiplexing said electrical data signals to generate a multiplexed data signal;

in response to detecting a loss of an optical data signal in one of said input channels, generating an electrical control signal for said input channel indicating the loss of said optical data signal;

time-division multiplexing said electrical control signals including said electrical control signal indicating loss of said optical data signal to generate a multiplexed control signal;

combining said multiplexed data signal with said multiplexed control signal to generate a composite electrical signal; and converting said composite electrical signal to a composite optical signal of a particular wavelength;

wavelength division multiplexing said composite optical signal with one or more other composite optical signals of different wavelengths to generate a Wavelength Division Multiplexing (WDM) composite optical signal that is transmitted over said network; and wherein in the event of said loss of said optical data signal in one of said input channels, said WDM composite optical signal includes said electrical control signal indicating loss of said optical data signal.

2. The method of claim 1, further comprising the steps of:

receiving said WDM composite optical signal over said network;

separating the received WDM composite optical signal into composite optical signals of different wavelengths;

generating a composite electrical signal from said composite optical signal that is separable into a multiplexed data signal and a multiplexed control signal;

demultiplexing said multiplexed data signal to generate respective electrical data signals for output channels corresponding to said input channels;

demultiplexing said multiplexed control signal to generate respective electrical control signals for said output channels; and converting said electrical data signals to optical data signals for said output channels.

3. Apparatus for transmitting signals from a plurality of input channels over a time division multiplexing (TDM) network, each of said input channels containing an optical data signal and an electrical control signal containing control information relating to said optical data signal, said apparatus comprising:

an optical receiver for converting each of said optical data signals to a respective electrical data signal;

a TDM data multiplexer for multiplexing said electrical data signals to generate a multiplexed data signal;

logic responsive to detecting a loss of an optical data signal in one of said input channels for generating an electrical control signal for said input channel indicating the loss of said optical data signal;

a TDM control signal multiplexer for multiplexing said electrical control signals to generate a multiplexed control signal signals including said electrical control signal indicating loss of said optical data signal that is combined with said multiplexed data signal to generate a composite electrical signal;

an optical transmitter for converting said composite electrical signal to a composite optical signal of particular wavelength;

a wavelength division multiplexer for combining said composite optical signal of a particular wavelength with one or more other composite optical signals of different wavelengths to generate a Wavelength Division Multiplexing (WDM) composite optical signal that is transmitted over said network; and wherein in the event of said loss of said optical data signal in one of said input channels, said WDM composite optical signal includes said electrical control signal indicating loss of said optical data signal.

4. The apparatus of claim 3, further comprising:
a WDM demultiplexer for receiving said WDM composite optical signal over said network and for separating the WDM composite optical signal into composite optical signals of different wavelengths;
an optical receiver for receiving one of the separated composite optical signals for generating a composite electrical signal from said composite optical signal that is separable into a multiplexed data signal and a multiplexed control signal;
a TDM data demultiplexer for demultiplexing said multiplexed data signal to generate respective electrical data signals for output channels corresponding to said input channels;
a TDM control signal demultiplexer for demultiplexing said multiplexed control signal to generate respective electrical control signals for said output channels; and
respective optical transmitters for converting said electrical data signals to optical data signals for said output channels.

5. In a time division multiplexing (TDM) optical network in which a composite optical signal is generated from signals from a plurality of input channels and transmitted over said network, wherein said composite optical signal is combined with one or more other composite optical signals of different wavelengths before being transmitted over said network, each of said input channels containing an optical data signal and an electrical control signal containing control information relating to said optical data signal signals including an electrical control signal indicating loss of said optical data signal, a method for regenerating said optical data signals and said electrical control signals, comprising the steps of:
receiving said composite optical signal over said network, wherein in the event of a loss of an optical data signal in one of said input channels, said composite optical signal includes said electrical control signal indicating loss of said optical data signal;
generating a composite electrical signal from said composite optical signal that is separable into a multiplexed data signal and a multiplexed control signal, wherein the generation of said composite electrical signal comprises separating the received composite optical signal into composite optical signals of different wavelengths through wavelength division demultiplexing, each of which is used to generate a composite electrical signal from which individual data signals and control signals are generated for output channels;
time division demultiplexing said multiplexed data signal to generate respective electrical data signals for output channels corresponding to said input channels;
time division demultiplexing said multiplexed control signal to generate respective electrical control signals for said output channels; and
convening said electrical data signals to optical data signals for said output channels.

6. In a time division multiplexed (TDM) optical network in which a composite optical signal is generated from signals from a plurality of input channels and transmitted over said network, wherein said composite optical signal is combined with one or more other composite optical signals of different wavelengths before being transmitted over said network, each of said input channels containing an optical data signal and an electrical control signal signals including an electrical control signal indicating loss of said optical data signal containing control information relating to said optical data signal, apparatus for regenerating said optical data signals and said electrical control signals, comprising:
an optical receiver for receiving said composite optical signal over said network and for generating a composite electrical signal from said composite optical signal that is separable into a multiplexed data signal and a multiplexed control signal, wherein said optical receiver comprises a wavelength division multiplexer (WDM) demultiplexer for separating said received composite optical signal into composite optical signals of different wavelengths, each of which is provided to said optical receiver to generate said composite electrical signal from which individual data signals and control signals are generated for output channels, wherein in the event of a loss of an optical data signal in one of said input channels, said composite optical signal includes said electrical control signal indicating loss of said optical data signal;
a TDM data demultiplexer for demultiplexing said multiplexed data signal to generate respective electrical data signals for output channels corresponding to said input channels;
a TDM control signal demultiplexer for demultiplexing said multiplexed control signal to generate respective electrical control signals for said output channels; and
respective optical transmitters for converting said electrical data signals to optical data signals for said output channels.

* * * * *